Patented Oct. 29, 1929

1,733,745

UNITED STATES PATENT OFFICE

ANDREW MARTIN AND JOHN JOHNSTON, JR., OF ESCONDIDO, CALIFORNIA

PROCESS OF PRODUCING FERTILIZER COMPOUNDS

No Drawing.    Application filed October 28, 1926.   Serial No. 144,914.

Our invention relates to humus fertilizer compound and a process for making humus fertilizer, and the objects of our invention are: first, to provide a humus fertilizer which is made of waste or refuse products; second, to provide a humus fertilizer compound, the ingredients of which are plentiful in all localities; third, to provide a humus fertilizer compound which is very efficient and effective, containing the necessary ingredients for making ground humus and fertile; fourth, to provide a humus fertilizer compound which may be easily and effectively compounded or produced in the locality in which is to be used, tending toward economy of production; fifth, to provide a novel method of producing humus fertilizer; sixth, to provide a novel humus fertilizer and a novel method of producing the same; seventh, to provide a humus fertilizer which makes the soil mellow and loose, thus facilitating irrigation and cultivation; eighth, to provide a quick method of producing humus fertilizer, and ninth, to provide a novel humus fertilizer compound and process of producing the same, which is very simple and economical to produce, very efficient, simple and economical.

With these and other objects in view, as will appear hereinafter, our invention consists of a certain novel compound and method of producing the same, as will be hereinafter described in detail and particularly set forth in the appended claims.

Our compound consists of the following ingredients in substantially the following proportions:

|  | Per cent |
|---|---|
| Sawdust, which is the ordinary sawdust from a saw mill, or fine shavings, about | 40 |
| Miscellaneous garbage, such as garbage from domestic use or refuse vegetables or vegetation of any kind, about | 40 |
| Nitrate of soda, about | 20 |

It has been found that the nitrate of soda may be omitted and still produce a very efficient humus fertilizer.

The humus fertilizer is prepared as follows:

The garbage, which may be any refuse, vegetation or vegetables, may include animal matter without injury, which produces a more effective fertilizer. This garbage is ground fine enough to pass through a one-quarter inch screen or less. Then the mass is placed in a suitable fermenting vat, which is watertight but open on the top, and let stand. It is preferred to have a vat about eight feet deep and it should be filled about two-thirds full. After the fermentation starts, water is added to keep the mass in a state of fermentation. The mass is agitated in the vat every twenty-four hours while it is fermenting to distribute the bacteria throughout the mass. It is let stand in a state of fermentation for ten days or two weeks and kept at a temperature of not less than 90° Fahrenheit. If the temperature is cool, artificial heat must be applied to the vat in a suitable manner to keep the mass the proper temperature for a maximum of fermentation.

After from ten days to two weeks of fermentation in the vat, the liquor is drawn from the mass and mixed with sawdust and small shavings. The solid matter, which is left in the vat, is then thoroughly intermingled with the shavings and liquor, and piled up and kept damp and let stand for three weeks or more at a temperature of 70° to 90° Fahrenheit, during which time a further fermentation and decomposition of the whole mass takes place, the wood and shavings absorbing large quantities of the fermented, decomposed garbage, thus accomplishing in a short time what would take years in the ordinary manner. This latter fermentation further increases the humus contents and other valuable products, and it also loses its bad odor. Then the mass is mingled with nitrate of soda, about 20% of the mass being nitrate of soda.

The mass is then let stand until used.

Though we have described a certain compound and a certain process of producing humus fertilizer, we do not wish to be limited to this particular compound and process, but desire to include in the scope of our invention, the compound and process substantially as set forth in the appended claims.

Having thus described our invention, what we claim as new and desire to secure by Letters Patent is:

1. The herein described method of producing humus fertilizer, consisting in grinding garbage fine; then fermenting the mass ten days to two weeks in an open top vat, agitating the mass every twenty-four hours, keeping the mass warm; and then mixing the mass with an equal amount of sawdust.

2. The herein described method of producing humus fertilizer, consisting in grinding garbage fine; then fermenting the resultant wet mass ten days to two weeks in an open top vat; and then mixing the mass with an equal amount of sawdust.

3. The herein described method of producing humus fertilizer, consisting in grinding garbage; then fermenting the resultant wet mass, adding water from time to time to keep it in liquid form, keeping the mass warm, and then mixing the mass with an equal amount of sawdust and shavings.

4. The herein described method of producing humus fertilizer, consisting in grinding garbage; then fermenting the resultant wet mass, adding water from time to time to keep it in liquid form, keeping the mass warm; then mixing the mass with an equal amount of sawdust and shavings; and then piling the mass up and letting it stand for three weeks or more.

5. The herein described method of producing humus fertilizer, consisting in grinding garbage; then fermenting the resultant wet mass, adding water from time to time to keep it in liquid form, keeping the mass warm; then mixing the mass with an equal amount of sawdust and shavings; and then mixing in a quantity of nitrate of soda, being about twenty percent of the mass.

6. The herein described method of producing humus fertilizer, consisting in grinding garbage fine enough to pass through a quarter-inch screen; then fermenting the resultant wet mass in a vat which is watertight and open on the top, keeping the mass warm; then after fermentation starts adding water to keep it suitably liquid; then agitating the mass every twenty-four hours, letting it stand from ten days to two weeks; then aerating the mass; if the temperature of the atmosphere is cool, heating the mass; then mixing the liquor from the mass with sawdust and small shavings; then intermingling the solid matter left from the mass with the saturated sawdust and shavings and liquor; and then piling the mass and keeping it damp, letting it stand three weeks or more.

7. The herein described method of producing humus fertilzer, consisting in grinding garbage fine enough to pass through a quarter-inch screen; then fermenting the resultant wet mass in a vat which is watertight and open on the top; then, after fermentation starts, adding water to keep it suitably liquid; then agitating the mass every twenty-four hours, letting it stand from ten days to two weeks; then aerating the mass, if the temperature of the atmosphere is cool, keeping the mass heated; then mixing the liquor from the mass with sawdust and small shavings; then intermingling the solid matter left from the mass with the saturated sawdust and shavings and liquors; then piling up the mass and keeping it damp, letting it stand three weeks or more; and then adding nitrate of soda in the amount of twenty per cent of the whole mass.

8. The herein described method of producing humus fertilizer, consisting in grinding garbage fine enough to pass through a quarter-inch screen; then fermenting the resultant wet mass in a vat which is watertight and open at the top; then after fermentation starts adding water to keep it suitably liquid; then agitating the mass every twenty-four hours, letting it stand from ten days to two weeks; then aerating the mass; if the temperature of the atmosphere is cool, heating the mass; then mixing the liquor from the mass with sawdust and small shavings; then intermingling the solid matter left from the mass with the saturated sawdust and shavings and liquor; then piling up the mass and keeping it damp and warm, letting it stand three weeks or more; and then adding other fertilizer to suit.

In testimony whereof, we have hereunto set our hands at Escondido, California, this 22nd day of October, 1926.

ANDREW MARTIN.
JOHN JOHNSTON, Jr.